United States Patent [19]

Holtmyer et al.

[11] Patent Number: 4,780,221

[45] Date of Patent: Oct. 25, 1988

[54] METHOD AND COMPOSITION FOR VISCOSIFYING HYDROCARBONS

[75] Inventors: Marlin D. Holtmyer; Charles V. Hunt, both of Duncan, Okla.

[73] Assignee: Halliburton Company, Duncan, Okla.

[21] Appl. No.: 62,760

[22] Filed: Jun. 15, 1987

[51] Int. Cl.[4] .......................................... E21B 43/26
[52] U.S. Cl. ................... 252/8.551; 137/13; 524/247; 524/249; 525/328.4
[58] Field of Search ............... 252/8.551, 315.4; 525/328.4; 524/249, 247, 923, 924

[56] References Cited

U.S. PATENT DOCUMENTS

| | | | |
|---|---|---|---|
| 2,667,457 | 1/1954 | McChrystal | 252/315.4 X |
| 2,734,861 | 2/1956 | Scott et al. | 252/315.4 X |
| 2,946,748 | 7/1960 | Steiner et al. | 52/8.551 |
| 3,284,393 | 11/1966 | Vanderhoff et al. | |
| 3,359,144 | 12/1967 | Atkins et al. | |
| 3,624,019 | 11/1971 | Anderson et al. | |
| 3,724,547 | 4/1973 | Bott | 166/274 |
| 3,850,586 | 11/1974 | Iwama et al. | |
| 4,012,327 | 3/1977 | Boothe et al. | 252/8.551 |
| 4,152,274 | 5/1979 | Phillips et al. | 252/8.551 |
| 4,166,723 | 9/1979 | Steigelmann | |
| 4,615,393 | 10/1986 | Sedillo et al. | 252/8.551 X |

*Primary Examiner*—Herbert B. Guynn
*Attorney, Agent, or Firm*—Robert A. Kent

[57] ABSTRACT

The present invention relates to a method and composition for viscosifying hydrocarbon liquids utilizing a viscosifying agent. The viscosifying agent comprises: (i) a copolymer of N,N-dimethylacrylamide and dimethylaminopropyl methacrylamide, (ii) a monocarboxylic acid and (iii) a selected amine having an ethanolamine structure admixed in a hydrocarbon liquid. The viscosifying agent constituents are admixed with the liquid hydrocarbon in an amount sufficient to effect viscosification of the hydrocarbon.

14 Claims, No Drawings

METHOD AND COMPOSITION FOR VISCOSIFYING HYDROCARBONS

BACKGROUND OF THE INVENTION

1. Field of the Invention

The present invention relates generally to methods of viscosifying or gelling hydrocarbon liquids. More specifically the present invention relates to methods of viscosifying liquid hydrocarbons such as diesel, kerosene and the like to produce fluids useful for the treatment of subterranean formations.

2. Prior Art

Hydraulic fracturing is an extensively used method for stimulating petroleum producing subterranean formations. Fracturing is commonly performed by contacting a subterranean formation with a viscous fracturing fluid having particulated solids, hereinafter referred to as propping agents, suspended therein, applying sufficient pressure to the fracturing fluid to open a fracture in the subterranean formation and maintaining this pressure while injecting the fracturing fluid into the fracture at a sufficient rate to extend the fracture into the subterranean formation. When the pressure on the fracturing fluid is reduced, the propping agent prevents the complete closure of the fracture. Viscous liquids are desirably used as fracturing fluids because they have been found to remain in the fracture long enough to permit buildup and maintenance of sufficient pressure to open a fracture. Additionally, a viscous fracturing fluid can support propping agents suspended therein.

SUMMARY OF THE INVENTION

The viscosifying agents of the present invention comprise the reaction product in a hydrocarbon fluid of a selected monocarboxylic acid and selected water-soluble amines with a copolymer having the general formula:

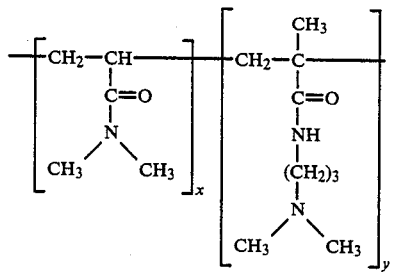

wherein X and Y represent monomer mole percent and X is from about 20 to about 70, Y is from about 30 to about 80 and $X+Y=100$. The copolymer can have a molecular weight in the range of from about 400,000 to in excess of several million or more and be useful in the performance of the present invention.

DESCRIPTION OF THE PREFERRED EMBODIMENT

The copolymer of the viscosifying agent of the present invention is one having the general formula:

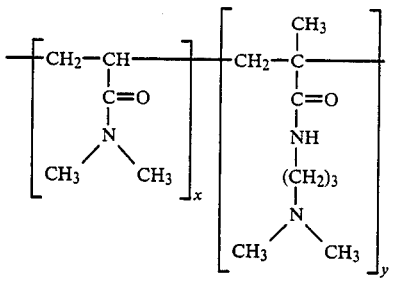

in which X and Y represent monomer mole percent and X is in the range of from about 20 to 70 and Y is in the range of from about 30 to 80 such that $X+Y=100$ The copolymer of the present invention may be prepared by conventional solution polymerization or inverse emulsion polmyerization methods such as those described in U.S. Pat. Nos. 3,284,393, 3,624,019 and 3,724,547.

In one preferred embodiment, the copolymer is prepared by inverse emulsion polymerization. In this method, for laboratory scale tests, a quantity of an aqueous solution of N, N-dimethylacrylamide is admixed with an aqueous solution of dimethylaminopropylmethacrylamide monomer in a container having oxygen purged therefrom by a constant flow of nitrogen gas. Preferably, the monomers comprise from about 25 percent to about 45 percent and most preferably about 33 percent by weight of the aqueous solutions. The particular portions of each solution are adjusted to provide the desired molar concentration in the copolymer. The monomers may be added to the container in any order. A surfactant or blend of surfactants then is admixed with an oil such as Isopar M, a refined kerosene marketed by Exxon Chemical Company, in a mixing vessel. The surfactant can comprise any surfactant which is capable of forming a water-in-oil emulsion of the monomers. Such surfactants are commonly referred to as emulsifiers. Oxygen is purged from the mixing vessel and the nitrogen purged aqueous solution of monomers is slowly added to the mixing vessel at a rate such that a water-in-oil emulsion is formed. The emulsion then is admixed with a reaction initiator such as 2,2'-azobis(2-4-dimethylvaleronitrile) or any other suitable initiator known to individuals in the art and maintained at a constant temperature in the range generally of from about 30° C. to 50° C. until the polymerization reaction begins. The precise reaction temperature is limited by the emulsifier utilized and the stability of the emulsion. This can be achieved on a laboratory scale by placing the reactants in a nitrogen purged stirred vessel in a constant temperature bath. In commercial applications the reactor vessel can be provided with suitable heating coils capable of maintaining an initial constant temperature in the reactant mixture suitable to initiate the polymerization reaction. The reaction is evidenced by a temperature exotherm. The polymerization reaction is considered complete about one hour after the reactants temperature returns to the original temperature level of the mixture.

The copolymer preferaby has a molecular weight in the range of from about 400,000 to about five million.

The copolymer is admixed with the liquid hydrocarbon which is to be viscosified in an amount of at least about 0.25 percent by weight of the liquid hydrocarbon and generally from 0.25 to about 6.0 percent. Preferably, the copolymer is admixed with the hydrocarbon liquid in an amount of from about 0.3 percent to about 4 percent by weight of the liquid hydrocarbon. Most preferably, the copolymer is admixed with the liquid hydrocarbon in an amount of from about 0.5 to about 2 percent by weight of the hydrocarbon liquid. Such rates of admixing correspond generally to an amount of from about 0.24 to about 3.2 grams per 100 milliliters of liquid hydrocarbon and preferably about 0.4 to about 1.6 grams per 100 milliliters of liquid hydrocarbon.

To the quantity of the foregoing copolymer in the liquid hydrocarbon is added a monocarboxylic acid and selected watersoluble amines to viscosify the liquid hydrocarbon. The monocarboxylic acid can comprise oleic acid, lauric acid, tall oil fractions and the like. The monocarboxylic acid may be generally defined by the formula R-COOH wherein R comprises an alkyl or alkenyl radical containing from about 11 to about 21 carbon atoms. The monocarboxylic acid is present in an amount at least sufficient to neutralize the copolymer through ion pair formations. The monocarboxylic acid imparts oil solubility to the copolymer which initially is in the form of an oil dispersible emulsion when initially admixed with the hydrocarbon to be viscosified. Most preferably, an excess of at least about 50 mole percent of that required to effect stoichiometric neutralization of the copolymer is preferred to achieve enhanced viscosification. The monocarboxylic acid may be used in amounts of 6 to 10 times or more the stoichiometric requirements without adversely effecting the ability of the mixture to viscosify liquid hydrocarbons. Preferably, the monocarboxylic acid is present in an amount of from about 1.0 to about 10 percent by weight of the hydrocarbon to be viscosified.

The selected water-soluble amines comprise compounds having the structure of an ethanolamine, such as for example, diethanolamine diethylethanolamine, triethanolamine, N-methydiethanolamine and the like. The selected amine is admixed in the hydrocarbon to be viscosified with the copolymer and monocarboxylic acid in an amount sufficient to effect viscosification of the liquid hydrocarbon. It has been found that an amount of the amine in the range of from at least about 0.5 percent by weight of the liquid hydrocarbon is sufficient to increase the viscosity of the liquid hydrocarbon. To achieve maximum viscosification of a liquid hydrocarbon, the selected amine preferably is admixed with the copolymer in an amount of from about 1.0 to about 2.5 percent by weight of the liquid hydrocarbon. While not required to effect viscosification of a liquid hydrocarbon, enhanced performance has been noted in some instances when the quantity of the selected amine is increased as the quantity of the monocarboxylic acid increases in the viscosifying agent. The upper limit for addition of the selected amine is that quantity which results in precipitation of the copolymer from the liquid hydrocarbon. This quantity can vary depending upon the copolymer constituent ratio, copolymer concentration, monocarboxylic acid and acid concentration in the viscosifying agent.

The order of addition of the copolymer, selected monocarboxylic acid and amine is not critical to the performance of the invention. Surprisingly, it has been found that a liquid hydrocarbon can be caused to rapidly and sometimes almost instantaneously gel by the addition of the monocarboxylic acid and amine followed by addition of the copolymer. The addition of the copolymer to a liquid hydrocarbon followed by the monocarboxylic acid and amine also results in the formation of a viscosified fluid, however, the rate of viscosity development is slower than in the other order of mixing.

Surprisingly, it has been found that the viscosifying composition of the present invention functions, when present in small quantities, to reduce the frictional drag of an organic liquid in flow through pipes or conduits having a continuous bore therethrough. The method of utilizing such composition to reduce frictional drag of a liquid hydrocarbon comprises adding a quantity of the copolymer, monocarboxylic acid and selected amine to the hydrocarbon such that an acid-base reaction product is formed which imparts drag reduction to the hydrocarbon liquid through formation of a polymeric network. The viscosifying composition is utilized in the same proportionate amounts as for viscosification of the hydrocarbon, however, the copolymer is generally present in an amount of less than 0.25 percent by weight of the hydrocarbon liquid. More specifically the copolymer is believed to be preferably present in an amount of from about 0.001 to about 0.2 grams per 100 milliliters of the hydrocarbon liquid for purposes of drag reduction.

To further illustrate the present invention, but not by way of limitation, the following examples are provided.

EXAMPLE I

To illustrate the preparation of the copolymer utilized in the viscosifying agent of the present invention the following procedure was followed. Various quantities of the monomers set forth in Table I were admixed in the molar ratios identified below to form an aqueous mixture. This mixture then was added to a Waring Blendor jar containing a quantity of Isopar M refined oil and a mixture of surfactants comprising an ethoxylated sorbitan monooleate and a tall oil fatty acid diethanolamide. The reactants are mixed in the Waring Blendor to form an emulsion while being maintained under a nitrogen purge. The surfactant is present in an amount of about five percent by weight of the emulsion which is considered sufficient to effect emulsification of the aqueous mixture with the oil. This emulsion then is transferred to a stirred reactor vessel. The reactor vessel is purged with nitrogen gas and the emulsion aqueous monomer mixture is introduced into the reactor while also being maintained under a nitrogen purge. A quantity of about 1 gram per 1000 grams of reactants of 2,2'-azobis (2-4-dimethylvaleronitrile) is admixed with the emulsion in the reactor vessel as a polymerization initiator. The reactor vessel is positioned in a constant temperature water bath having a temperature of about 37° C.

The reactor vessel is stirred at about 600 rpm throughout the duration of the reaction. Reaction initiation is noted a short time after addition of the initiator by a temperature rise in the reactor vessel. The temperature is monitored and the reaction is considered complete one hour after the temperature of the mixture returns to the original temperature of the mixture. All of the produced emulsions contained 25% by weight monomers before polymerization. Each of the produced polymerized emulsions was a water-in-oil emulsion.

TABLE I

| Sample No. | Monomer, Mole Percent | | Reaction Temp., °C. |
|---|---|---|---|
| | NNDMA[1] | DMAPMA[2] | |
| 1 | 40 | 60 | 37.3 |
| 2 | 30 | 70 | 37.2 |
| 3 | 50 | 50 | 37.4 |
| 4 | 60 | 40 | 37.2 |
| 5 | 70 | 30 | 37.3 |
| 6[3] | 25 | 75 | 37.2 |

[1]N,N—dimethylacrylamide
[2]Dimethylaminoproplymethacrylamide
[3]ethoxylated dodecylphenol utilized as surfactant instead of ethoxylated sorbitan monooleate

EXAMPLE II

To illustrate the ability of the viscosifying agent of the present invention to gel liquid hydrocarbons, the following tests were performed. To a quantity of kerosene, 2.0% by volume of the kerosene of a 25 percent active, 50:50 mole percent copolymer corresponding to Sample No. 3 of Example I, was added. To this mixture, varying quantities of tall oil and N-methyldiethanolamine then were added as indicated in Table II, below. The viscosity of the resultant mixture then was measured on a Model 35 Fann viscometer at ambient temperature.

TABLE II

| Test No. | Volume % Tall Oil | Volume % MDEA[1] | Fluid Mixture Viscosity, cp. |
|---|---|---|---|
| 1 | 0 | 0 | 4 |
| 2 | 0 | 0.5 | 4 |
| 3 | 2.0 | 0 | 4 |
| 4 | 2.0 | 0.5 | 7 |
| 5 | 2.0 | 1.0 | 8 |
| 6 | 4.0 | 0.5 | 9 |
| 7 | 4.0 | 0.75 | 12 |
| 8 | 4.0 | 1.0 | 17 |
| 9 | 5.5 | 1.0 | 50 |
| 10 | 6.0 | 1.0 | 53 |
| 11 | 6.5 | 1.0 | 58 |
| 12 | 8.0 | 2.0 | 71 |

[1]MDEA: N—methyldiethanolamine

The data clearly indicates the necessity of having the copolymer, monocarboxylic acid and selected amine present in the viscosifying agent to effectively gel a hydrocarbon liquid.

EXAMPLE III

To illustrate the ability of the gelling agent of the present invention to viscosify various liquid hydrocarbons, the following tests were performed.

A gelling agent comprising an admixture of: a 25 percent active, 50:50 mole percent copolymer corresponding to Sample No. 3 of Example I, present in an amount of 2.0 percent by volume of the hydrocarbon liquid; oleic acid, present in an amount of 6 percent by volume of the hydrocarbon liquid; and N-methyldiethanolamine present in an amount of 1.0 percent by volume of the hydrocarbon is admixed in accordance with the method of the present invention with the hydrocarbons set forth in Table III. The initial viscosity of all of the fluids was 5 cp. or less as measured on a Model 35 Fann viscometer. The viscosity of the resultant mixture then was determined at ambient temperature. The results also are set forth in Table III.

TABLE III

| Hydrocarbon Liquid | Gelled Fluid Viscosity, cp. |
|---|---|
| kerosene | 57 |
| diesel | 66 |
| crude oil | 64 |
| light cycle oil | 62 |
| gasoline | 23 |

The foregoing results clearly demonstrate the ability of the gelling agent of the present invention to viscosify various hydrocarbon liquids.

EXAMPLE IV

To illustrate the utility of various compounds having the ethanolamine structure as the selected amine in the viscosifying agent of the present invention, the following tests were performed.

A copolymer comprising a 25 percent active, 60:40 mole percent copolymer corresponding to Sample No. 4 of Example I was admixed in various amounts as set forth below in Table IV with tall oil or oleic acid in the amounts indicated below and various amines to determine whether or not the composition would viscosify kerosene. The percentages set forth in Table IV are in volume percent of the total kerosene volume except as otherwise noted. The viscosity was measured on a Model 35 Fann viscometer at ambient temperature. The initial viscosity of the kerosene was about 4 cp. the results are set forth below:

TABLE IV

| Sample No. | Copolymer, Wt. %/ 100 ml. Kerosene | Monocarboxylic Acid, Volume % | | Amine Volume % | | Gelled Kerosene Viscosity, cp. |
|---|---|---|---|---|---|---|
| 1 | 0.25 | tall oil | 3.0 | MDEA[1] | 0.5 | 17 |
| 2 | 0.5 | tall oil | 2.0 | MDEA | 0.5 | 7 |
| 3 | 0.5 | oleic acid | 6.0 | MDEA | 1.0 | 52 |
| 4 | 0.5 | tall oil | 6.0 | TEA[2] | 1.0 | 16 |
| 5 | 0.5 | tall oil | 6.0 | DEEA[3] | 1.0 | 46 |
| 6 | 0.5 | tall oil | 8.0 | TEA | 1.0 | 49 |
| 7 | 0.5 | tall oil | 8.0 | MDEA | 2.0 | 75 |

[1]MDEA: N—methyldiethanolamine
[2]TEA: triethanolamine
[3]DEEA: diethylethanolamine The foregoing data clearly illustrate the ability of compounds havng a ethanolamine structure to function in the viscosifying agent of the present invention.

EXAMPLE V

To illustrate the effect the mixing order of the constituents of the present invention has upon the viscosification of a liquid hydrocarbon and to illustrate the criticality of the three constituents of the composition, the following tests were performed. To a quantity of kerosone, various volumes of copolymer, monocarboxylic acid and/or amine are admixed in a Waring Blendor as set forth in the following Table V. The admixture then is visually inspected to determine whether the kerosene has been viscosified by the constituents admixed therewith. The results of the inspection are set forth in Table V, below. The copolymer samples each comprised 25 percent active solutions.

TABLE V

| Sample No. | Copolymer Emulsion Volume % | Monomer Mole % in Copolymer NNDMA[1]:DMAPMA[2] | Monocarboxylic Acid, Volume % | Amine Volume % | Comments |
|---|---|---|---|---|---|
| 1. | 0 | — | oleic (6) | None | no viscosity chg[5] |
| 2. | 0 | — | oleic (6) | MDEA[4] (1) | no viscosity chg |
| 3. | 0 | — | oleic (6) | MDEA (1.5) | no viscosity chg |
| 4. | 4.2 | 50:50 | oleic (6) | MDEA (1.5) | gelled instantly upon addition of third component |
| 5. | 4.2 | 40:60 | None | None | no viscosity chg |
| 6. | 4.2 | 40:60 | oleic (6) | None | no viscosity chg |
| 7. | 4.2 | 40:60 | oleic (6) | MDEA (1) | gelled instantly upon addition of third component |
| 8. | 2.1 | 40:60 | None | MDEA (1) | no viscosity chg |
| 9. | 2.1 | 40:60 | oleic (6) | MDEA (1) | gelled instantly upon addition of third component |
| 10. | 0 | — | None | MDEA (1) | no viscosity chg |
| 11. | 0 | — | oleic (6) | MDEA (1) | no viscosity chg |
| 12. | 2.1 | 40:60 | oleic (6) | MDEA (1) | gelled instantly upon addition of third component |
| 13. | 2.1 | 50:50 | tall oil (6) | MDEA (1) | gelled instantly upon addition of third component |
| 14. | 2.1 | 30:70 | tall oil (6) | NONE | no viscosity chg |
| 15. | 2.1 | 30:70 | tall oil (6) | MDEA (1) | gelled within seconds of adding third component |
| 16. | 2.1 | 30:70 | tall oil (6) | MDEA (1.5) | gelled instantly upon addition of third component |
| 17. | 2.1 | 100:0[3] | tall oil (6) | MDEA (1) | no viscosity chg |

[1]N,N—dimethylacrylamide
[2]Dimethylaminopropylmethacrylamide
[3]the polymer comprised only N,N—dimethacrylamide, no copolymer was used
[4]MDEA: N—methyldiethanolamine
[5]chg: change The results of the foregoing tests clearly demonstrate that all three constituents of the composition are required to viscosify a liquid hydrocarbon. The results of the series of tests 1-4, 5-7 and 10-12 clearly illustrate that the order of addition has no significant effect upon the ability of the composition of the present invention to viscosify a liquid hydrocarbon. In these series of samples, the additional component in each succeeding sample was sequentially added to the contents of the preceeding sample.

While preferred embodiments of the invention have been described herein, it is to be understood that changes or modifications can be made in the composition and method by an individual skilled in the art without departing from the spirit or scope of the invention as set forth in the appended claims.

What is claimed is:

1. A method of viscosifying a hydrocarbon liquid to produce a fluid useful for the treatment of subterranean formations which comprises
   admixing a quantity of a viscosifying agent comprising a copolymer of N,N-dimethylacrylamide and dimethylaminopropylmethacrylamide having a molecular weight of at least about 400,000 and a molar ratio of N,N-dimethylacrylamide to dimethylaminopropylmethacrylamide in said copolymer in the range of from about 20:80 to about 70:30 with a monocarboxylic acid having the general formula R—COOH wherein R is an alkyl or alkenyl radical having 11 to 21 carbons, said monocarboxylic acid being present in an amount sufficient to neutralize said copolymer through ion pair formation and a selected water soluble amine having an ethanolamine structure with a hydrocarbon liquid, said copolymer being present in an amount of at least about 0.25 percent by weight of said hydrocarbon liquid, said amine being present in an amount sufficient in combination with said copolymer and monocarboxylic acid to viscosify said hydrocarbon.

2. The method of claim 1 wherein said monocarboxylic acid comprises at least one member selected from the group consisting of tall oil, oleic acid and lauric acid.

3. The method of claim 1 wherein said selected amine comprises at least one member selected from the group consisting of methyldiethanolamine, diethanolamine and triethanolamine.

4. The method of claim 1 wherein said viscosifying agent is present in an amount of from about 0.25 to about 6 percent by weight of said hydrocarbon liquid.

5. The method of claim 1 wherein said copolymer has a molar ration of N,N-dimethylacrylamide to dimethylaminopropyl methacrylamide in the range of from about 1:3 to about 2.3:1.

6. The method of claim 1 wherein said copolymer has a molecular weight in the range of from about 400,00 to five million.

7. The method of claim 1 wherein said monocarboxylic acid is present in an amount of from about 0.5 to about 10 percent by weight of said hydrocarbon liquid.

8. A composition for viscosifying a hydrocarbon liquid useful in forming fluids useful for the treatment of subterranean formations comprising:

a copolymer having the general structure:

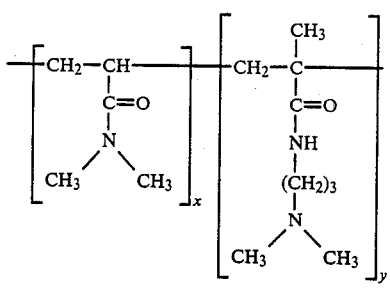

wherein X and Y represent monomer mole percent and X is in the range of from about 20 to about 70 and Y is in the range of from about 30 to about 80 and X+Y=100 and the copolymer has a molecular weight of at least about 400,00;

a monocarboxylic acid or mixture of acids of the general formula:

R—COOH wherein R represents an alkyl or alkenyl radical having from 11 to 21 carbon atoms, present in an amount at least sufficient to neutralize said copolymer through ion pair formation; and a selected water soluble amine having an ethanolamine structure present in a an amount sufficient in combination with said copolymer and said monocarboxylic acid to viscosify a liquid hydocarbon.

9. The composition of claim 8 wherein X is in the range of from about 40 to about 60 and Y is in the range of from about 40 to about 60.

10. The composition of claim 8 wherein said monocarboxylic acid comprises at least one member selected from the group consisting of oleic acid, lauric acid and tall oil.

11. The composition of claim 8 wherein said selected amine comprises at least one member selected from the group consisting of diethanolamine, methyldiethanolamine and triethanolamine.

12. The composition of claim 8 wherein said copolymer is present in an amount sufficient to provide a concentration in a liquid hydrocarbon to be viscosified of from about 0.25 to 6 percent by weight of said liquid hydrocarbon.

13. The composition of claim 8 wherein said monocarboxylic acid is present in an amount sufficient to provide a concentration in a liquid hydrocarbon to be viscosified of from about 0.5 to 10 percent by weight of said liquid hydrocarbon.

14. The composition of claim 8 wherein said selected amine is present in an amount sufficient to provide a concentration in a liquid hydrocarbon to be viscosified of from about 1 to 2.5 percent by weight of said liquid hydrocarbon.

* * * * *